United States Patent Office 3,366,164
Patented Jan. 30, 1968

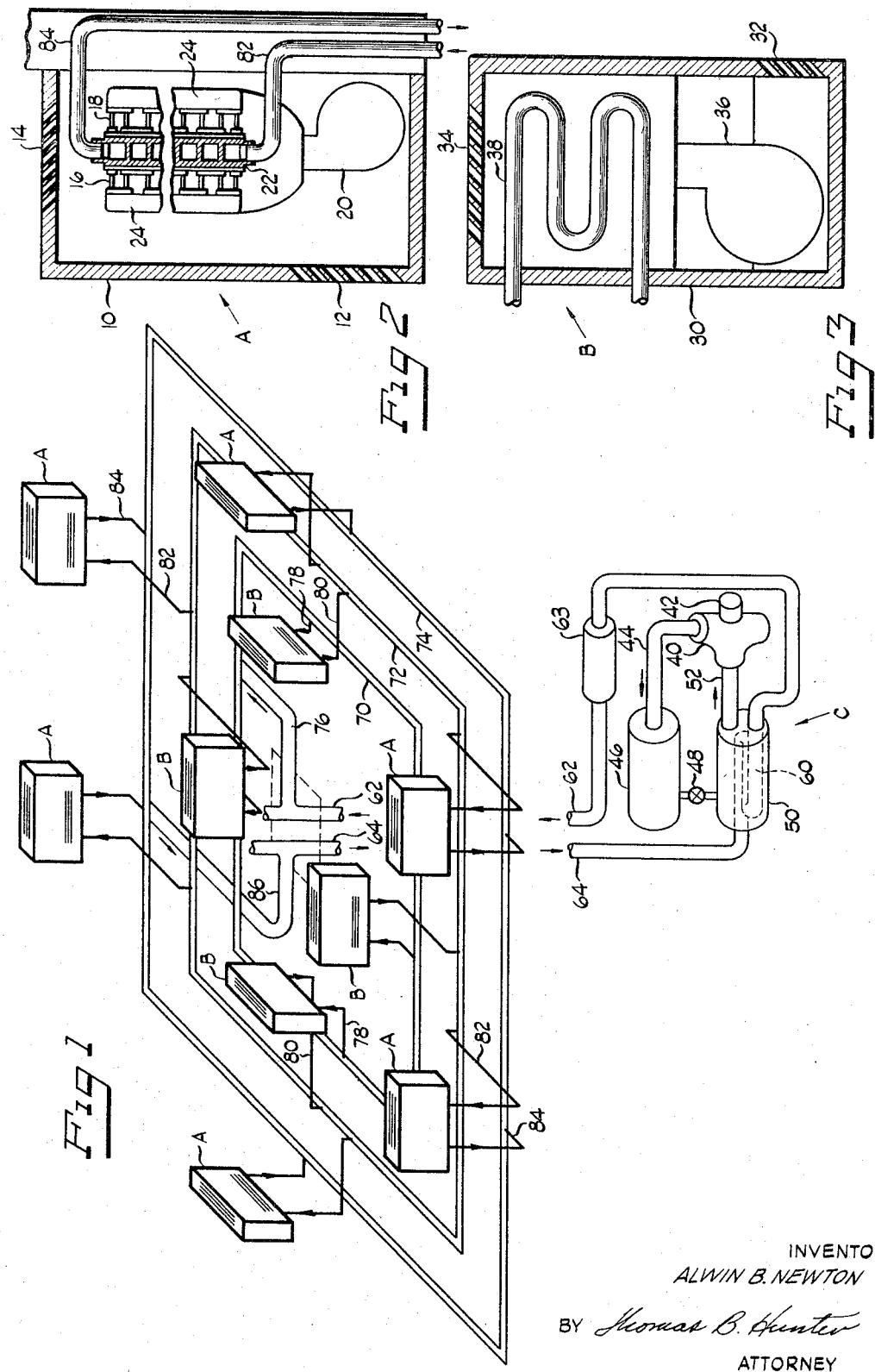

3,366,164
MULTI-ROOM AIR CONDITIONING SYSTEM
Alwin B. Newton, York, Pa., assignor to Borg-Warner Corporation, a corporation of Illinois
Filed Jan. 24, 1966, Ser. No. 522,575
6 Claims. (Cl. 165—2)

This invention relates to multi-room air conditioning systems, and more particularly to a combination vapor cycle and thermoelectric (Peltier) refrigeration air conditioning system which uses a simplified piping arrangement for supplying a heat exchange medium to a plurality of room air conditioning units.

Air conditioning systems for multi-room buildings require special considerations which are relatively unimportant in residential installations and other types of buildings such as theaters, department stores, and similar structures having large, open areas with a small external heat gain relative to the internal load. For example, multi-room buildings often have a large number of rooms located in the peripheral areas such that the solar heat gain may amount to 30 to 50% of the total heat load in such area. Not only is the magnitude of the solar heat load important, but it creates special problems in temperature control because the external load changes throughout the day as different areas are exposed to solar radiation.

The present invention has particular application in multi-room buildings which include both peripheral and interior zone spaces. The peripheral zone may be considered as extending from 12 to 18 feet inwardly from the outer wall toward the centerline of the building, and generally has large glass areas open to solar radiation. The peripheral zone is also apt to be sub-divided into a large number of small spaces; whereas the interior zone will commonly be divided into relatively large areas, such as stenographic rooms, lobbies, file rooms, etc. It is clear, therefore, that the peripheral zone areas will not only be subject to rapidly changing cooling loads in the summer (due to shifting of the sun's position and variations in the weather) but will also require heating in the winter. During the intermediate seasons, certain sides of the building (East, South, and West) will usually require cooling part of the day and heating at other times, while other sides (particularly the North side) may require heating continuously. The internal zone spaces, where the thermal loads are derived almost entirely from lights, office equipment, and people, will normally require cooling at a fairly uniform rate throughout the entire year.

The type of air conditioning system used in a multi-room building is often referred to in the trade by terms which relate to the piping or water distribution arrangement. In a "four-pipe" system, each room air conditioning unit is supplied with heated and chilled water through separate lines and is returned to the boiler and liquid chiller through separate lines, respectively. In a "three-pipe" system, each room air conditioning unit is supplied with heated and chilled water through separate lines, but the returning water is mixed together in a common line for return to the liquid chiller and water heater.

The principal advantage of a three-pipe over a four-pipe system is the lower installation cost resulting from the omission of the extra line for returning the water to the liquid chiller or heater. Unfortunately, a number of problems have plagued the three-pipe system, principally in the area of operating economy. The cost of chilling and heating water at a temperature which is approximately intermediate the desired operating temperature of the chilled water and hot water is obviously much higher than cooling the returning water from the units receiving chilled water and heating the water returning from the units receiving hot water in a four-pipe system. Nevertheless, the savings in piping costs by omitting the one pipe are so substantial that the three-pipe system has achieved significant commercial success. In this connection, it has been estimated that the cost of providing piping for the water distribution in the typical multi-room system may run as high as 50% of the cost of the entire system. In the past, most efforts have been directed toward lowering the cost and improving the efficiency of the liquid chiller and other mechanical components; but it can be seen from the foregoing analysis that savings achieved in the piping and water distribution system represent a greater percentage of the total job cost than economies in other areas.

In general, the present invention is directed to a system wherein the interior zones are provided with conventional fan coil units which are supplied with chilled water at all times. The chilled water passing through the fan coil units is directed then into a closed conduit system which, in turn, supplies the sink side of a plurality of thermoelectric conditioning units. The latter, as understood by those skilled in the art, are adapted to both heat and cool depending on the load conditions at any given time. An important aspect of the invention is in the recognition that the temperature of the water leaving the heat exchangers in the fan coil units is ideally suited to the efficient operation of the thermoelectric conditioning units. The water temperature will, under normal operating conditions, be at a level which permits the thermoelectric units to function both as heaters and coolers, the water acting as a source of heat when the heat is pumped into the room by the thermoelectric unit and as a coolant for the sink side when the thermoelectric units are operated as coolers.

It is, therefore, a principal object of the invention to provide a multi-room air conditioning system in which considerable economies can be achieved in the water distribution piping throughout the building. Another object of the invention is to provide an air conditioning system employing a plurality of conventional fan coil units for the interior zone spaces and thermoelectric air conditioning units for the peripheral zone spaces. Another object of the invention is to provide a system which takes advantage of the fact that, under certain conditions, some of the peripheral zone spaces will require heating and others will require cooling, the net effect being that the water returned to the chiller will be at a lower temperature than that which would be returned if all of the thermoelectric units were operating as coolers. Additional objects and advantages will become apparent from reading the following detailed description taken in conjunction with the drawings, wherein:

FIGURE 1 is a schematic representation of a typical floor plan in a multi-room office building;

FIGURE 2 is a cross-sectional view of a thermoelectric conditioning unit suitable for use in the present invention; and FIGURE 3 is a cross-sectional view of a fan coil unit of the type used for the interior zone spaces.

Referring now to FIGURE 1, a typical floor plan of a multi-room office building includes a peripheral zone, an interior zone, and a central service area. The peripheral zone, generally considered to be the first 12 to 18 feet of space from the exterior walls of the building toward the centerline thereof is usually divided up into a large number of individual offices and is also subject to the greatest variation in the heating and cooling loads imposed thereon. The interior zone spaces extend inwardly from the boundary line of the peripheral zone spaces toward the service area in which are located the elevators, mail chutes, electric power and telephone lines, and water conduits.

In a preferred embodiment of the invention, the room air conditioning units A located in the peripheral zone comprises Peltier thermoelectric devices (FIGURE 2), while the room air conditioning units B in the interior zone comprise conventional fan coil units (FIGURE 3). The thermoelectric units A each comprise a housing 10 having an air inlet 12 and an air outlet 14, a pair of thermoelectric modules 16, 18, and a fan or other air circulating mechanism 20. The modules 16, 18 are arranged with their respective sink sides in thermal communication with a liquid heat exchanger 22 through which a liquid heat exchange medium is circulated; and the load sides of modules 16, 18 are provided with heat exchange fins 24 arranged in the path of air circulated from the discharge side of the fan 20 before the air is directed into the room through the air outlet 14. Depending on the direction of unidirectional electrical energy supplied to the modules 16, 18, the thermoelectric unit can be operated as both a heater or a cooler. When the unit is operated as a cooling device, heat is abstracted from the air circulating over the heat exchange fins 24 and rejected at the sink side to the water flowing through in heat exchanger 22; and when heating is required, heat is abstracted from the liquid heat exchange medium and rejected to the room air circulating over the fins 24.

The fan coil units B each comprise a housing 30 having an air inlet 32 and an air outlet 34. A fan or other suitable air circulating device 36 is arranged in the lower portion of the housing and is adapted to draw room air through the inlet 32 and discharge it over a heat exchange coil 38, which is located in the path between the discharge side of the fan and the air outlet 34.

The water distribution system illustrated in FIGURE 1 is adapted to supply a chilled heat exchange medium from a liquid chiller C having a vapor cycle refrigeration system to the individual room air conditioning units on each floor of the building. The liquid chiller C comprises a compressor 40 driven by motor 42, a hot gas line 44, a condenser 46, an expansion valve 48 between the condenser and an evaporator 50, and a cold gas line 52 back to the compressor. The liquid to be chilled is circulated through a chilled liquid coil 60 in the evaporator and conducted through a supply riser 62 located in the central service area. Return riser 64, also located in the service area, returns liquid to the inlet side of the chilled liquid coil 60.

On each floor of the building, there are a plurality of generally concentric conduit systems in the form of closed circuit pipe loops 70, 72, and 74. The innermost conduit system 70 is interconnected to the supply riser 62 by means of a conduit 76 which is adapted to feed liquid to each of the interior zone units B through individual supply lines 78. After passing through the heat exchangers 38 in each of the fan coil units, the leaving liquid is forwarded to an intermediate conduit system 72 through individual outlet lines 80. The intermediate conduit system then feeds all of the peripheral zone units A through individual inlet lines 82; and after passing through the heat exchanger in the thermoelectric room air conditioning units, the leaving water is directed into the outermost conduit system 74 through outlet lines 84. The leaving water from all the peripheral zone units is mixed in the outer conduit systems and directed through conduit 86 to the return riser 64 where it flows back to the chiller C.

One of the advantages of the present invention is due to the fact that the water from the fan coil units, which is introduced into the second conduit system 72, is normally about 54° to 56° F. Water at this temperature can be effectively used as both a cooling medium for the thermoelectric sink when such units are operating as coolers and as a source of heat energy when they are operating as heaters. Another advantage results from operating under conditions when certain of the peripheral zones require heating and others require cooling. While the entering water temperature for all of the thermoelectric units will be relatively constant (54° to 56° F.), the water leaving a particular unit will either be higher or lower than this level, depending upon whether the unit is operating as a heater or a cooler. When the exiting water from all units on heating is mixed with the exiting water from all units on cooling, the net heat gain (or loss) will be relatively small; and the temperature of the mixture will be fairly close to the temperature of the water leaving the fan coil units. Consequently, the load on the water chiller is not significantly higher under these conditions than it would be if none of the units in the exterior zone was in operation.

Another important aspect of the invention relates to the amount of water (or other suitable liquid, heat exchange medium) is circulated through the system. Several advantages are obtained by the fact that a higher temperature difference between the leaving and returning chilled water is produced by using the two sets of units and passing the water serially from the conventional units to the thermoelectric units and then to the chiller. In a conventional system, all of the air conditioning units are supplied with water at about 45° F.; and the water is returned to the chiller at about 53° to 55° F. In the present system, the 53°–55° F. water leaving the conventional units is passed to the thermoelectric units where it is further heated to approximately 70° F. (when maximum cooling is required by all of the exterior zones). In view of the fact that substantially the same load is being handled as would be the case if conventional units were employed throughout both the interior and exterior zones, and since the water temperature range is about 25° F. as compared to 10° F., it is apparent that the total amount of water circulated per unit of time is about 40% of the requirements in a conventional system. Since less water is circulated, smaller diameter piping can be used throughout the system, resulting in considerable savings. Additional savings may be obtained by employing a smaller chiller. In the present system, the chiller operates at a higher mean temperature difference. The surface temperature of the heat exchange coil in either case would be approximately 40° F.; and, in a conventional system, the $\Delta T$ would be about 10°, viz., $$\left(\frac{55°+45°}{2}-40°\right)$$

whereas in the present system, the $\Delta T$ would be about 17½°, viz., $$\left(\frac{70°+45°}{2}-40°\right)$$

The heat exchange surface area in the chiller can thus be reduced by about 50% and the chiller can be smaller for the same total refrigeration capacity.

The foregoing discussion represents somewhat of an idealized situation, because the electrical input to the thermoelectric units is reflected in additional B.t.u.'s of heat energy which are required to be removed by the circulating water system; and the economies may be somewhat less in an actual installation. However, instead of a 60% reduction in the total amount of water circulated, it is entirely feasible to achieve a reduction of about 40%, which is still substantial, considering the total piping costs for a typical installation.

If all of the peripheral zone units A were on a heating cycle, the sink side heat exchangers would be cooling the water passing therethrough. Depending on the amount of heating required, the returning water temperature would eventually approach the normal supply temperature of 45° F. This results in reducing the load imposed on the chiller until the heating load of the peripheral zone units may be sufficiently high so that the chiller can be turned off. This point would occur when peripheral zone units are cooling the water supplied to conduit system 74 to a temperature of 45° F. or below.

Under the operating conditions mentioned above, (when all of the peripheral zone units are on heating), the water being returned to the chiller may be even less than 45° F. Obviously, the operation of the chiller may be discontinued under these circumstances, but if the water temperature is below 45° F., it is too cold to supply the interior zone units. Accordingly, it may be desirable to include a heater 63 in line 62 between the chiller and the conduit system supplying the interior zone units B. The heater would then be operated to maintain the water leaving the chiller heat exchange coil 60 at a temperature level of at least 45° F.

In referring to the interior zone units B as conventional fan coil units, it should be understood that such units are not to be restricted to a floor type unit with vertical air discharge. Such units may also be of the horizontal type suspended in ceiling areas and arranged to supply air through duct work. They may also supply more than one room within a particular zone by having branch ducts opening into various rooms with a single heat exchange coil positioned upstream from the outlets.

Moreover, while the heat exchangers in both the peripheral zone units A and the interior zone units B will normally utilize fans to circulate room air over the heat transfer surfaces, this does not exclude the possibility of using induction units which induce room air over the heat exchangers having primary air supplied from a central source.

While this invention has been described in connection with a certain specific embodiment thereof, it is to be understood that this is by way of illustration and not by way of limitation; and the scope of the appended claims should be construed as broadly as the prior art will permit.

What is claimed is:

1. A multi-room air conditioning system for a building having peripheral zone spaces and interior zone spaces comprising a plurality of air conditioning units in said interior zone spaces, each of said air conditioning units including a liquid-to-air heat exchanger and means for circulating room air over said heat exchanger; a plurality of thermoelectric air conditioning units in said peripheral zone spaces, each of said thermoelectric air conditioning units including a thermoelectric module having a load side and a sink side, a first heat exchange means associated with said sink side, second heat exchange means associated with said load side, and means for circulating air over said second heat exchange means; means for directing a chilled, liquid heat exchange medium to the inlet side of each of the liquid-to-air heat exchangers; and means for conducting said heat exchange medium from said liquid-to-air heat exchangers to said first heat exchange means.

2. A multi-room air conditioning system as defined in claim 1 including a first conduit system from which all of said interior zone conditioning units are supplied; a second conduit system receiving the heat exchange medium from said interior zone conditioning units and supplying it to said thermoelectric conditioning units; a third conduit system receiving heat exchange medium from said thermoelectric conditioning units; and conduit means interconnecting said first and third conduit systems.

3. A multi-room air conditioning system as defined in claim 2 including a liquid chiller in said interconnecting conduit means to chill the medium returning from said thermoelectric conditioning units.

4. A multi-room air conditioning system as defined in claim 3 including heating means for heating the heat exchange medium supplied to said interior zone conditioning units in the event the temperature of said medium falls below a predetermined level.

5. A method of air conditioning a multi-room building having peripheral zones and interior zones including the steps of supplying a chilled heat exchange medium to said interior zones and effecting heat transfer between the air in said zones and said heat exchange medium, thereby increasing the temperature of medium leaving said interior zones; transferring the leaving heat exchange medium from said interior zones to said peripheral zones; pumping heat by means of the Peltier effect from said heat exchange medium to air in said peripheral zones when heating is required in said zones and pumping heat from the air in said zones into said heat exchange medium when cooling is required in said zones; and returning said heat exchange medium to a liquid chiller for subsequent supply to said interior zones.

6. A method of air conditioning as defined in claim 5 including the step of heating the heat exchange medium supplied to said interior zones when the temperature of the heat exchange medium returning from said peripheral zones is below about 45° F.

References Cited

UNITED STATES PATENTS

| | | | |
|---|---|---|---|
| 3,054,840 | 9/1962 | Alsing | 62—3 X |
| 3,165,148 | 1/1965 | Soule | 165—50 X |
| 3,165,900 | 1/1965 | Huntington | 62—3 |
| 3,179,162 | 4/1965 | McFarlan | 165—22 X |

ROBERT A. O'LEARY, *Primary Examiner.*

A. W. DAVIS, *Assistant Examiner.*